United States Patent [19]

Firmin

[11] Patent Number: 5,058,309

[45] Date of Patent: Oct. 22, 1991

[54] STEERABLE FISHING LURE

[75] Inventor: Herman P. Firmin, Baton Rouge, La.

[73] Assignee: Knight Manufacturing Company, Inc., Tyler, Tex.

[21] Appl. No.: 526,281

[22] Filed: May 21, 1990

[51] Int. Cl.⁵ ............................................. A01K 91/00
[52] U.S. Cl. .................................. 43/42.13; 43/42.22
[58] Field of Search ........................... 43/42.13–42.14, 43/42.19, 42.03, 42.2, 42.46, 42.47

[56] References Cited

U.S. PATENT DOCUMENTS

| | | | |
|---|---|---|---|
| 2,883,786 | 4/1959 | Smith | 43/42.22 |
| 4,317,305 | 3/1982 | Firmin | 43/42.24 |
| 4,653,218 | 3/1987 | Margulis | 43/42.2 |
| 4,742,639 | 5/1988 | Gunn | 43/42.13 |
| 4,769,940 | 9/1988 | Doss | 43/42.13 |
| 4,773,180 | 9/1988 | Shimizu | 43/42.13 |

Primary Examiner—Kurt Rowan
Assistant Examiner—Chuck Y. Mah
Attorney, Agent, or Firm—Baker & Botts

[57] ABSTRACT

A steerable fishing lure (10) for reaching areas of water covered or shaded by overhanging structures comprises lure bait assembly (12), hook assembly (14), and rudder mechanism (16). Rudder mechanism comprises rudder dish (28) and harness (30). Rudder dish (28) includes concave face (32) for receiving water and directing water so as to stabilize steerable lure (10) as it moves in water. Rudder dish face (32) is sufficiently large to produce rudder action for lure (10). Harness (30) integrally attached to fishing lure (10) and firmly holds rudder dish (28). Harness (30) permits position adjustment of rudder dish (28) for a right, center, or left steering orientation. Rudder dish (28) also includes bottom bias points (56, 58, 60) to bias steering orientation of rudder dish (28) in harness (30).

6 Claims, 2 Drawing Sheets

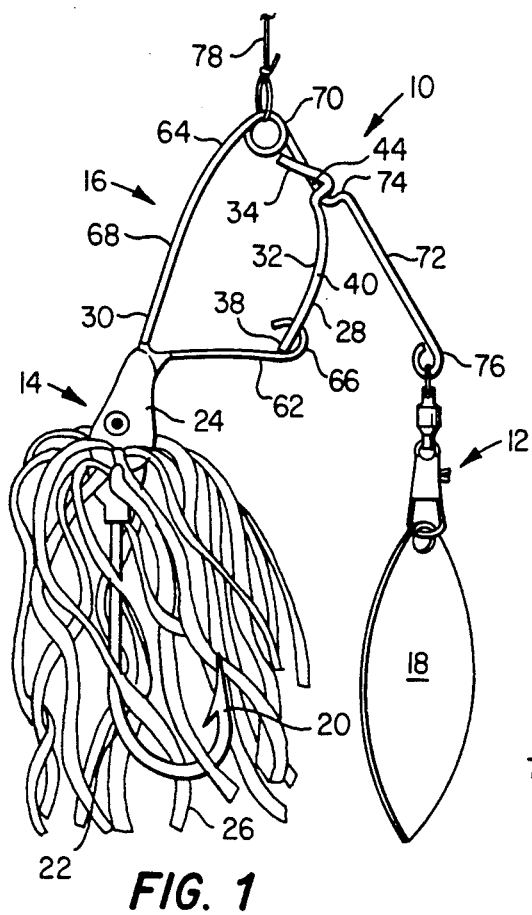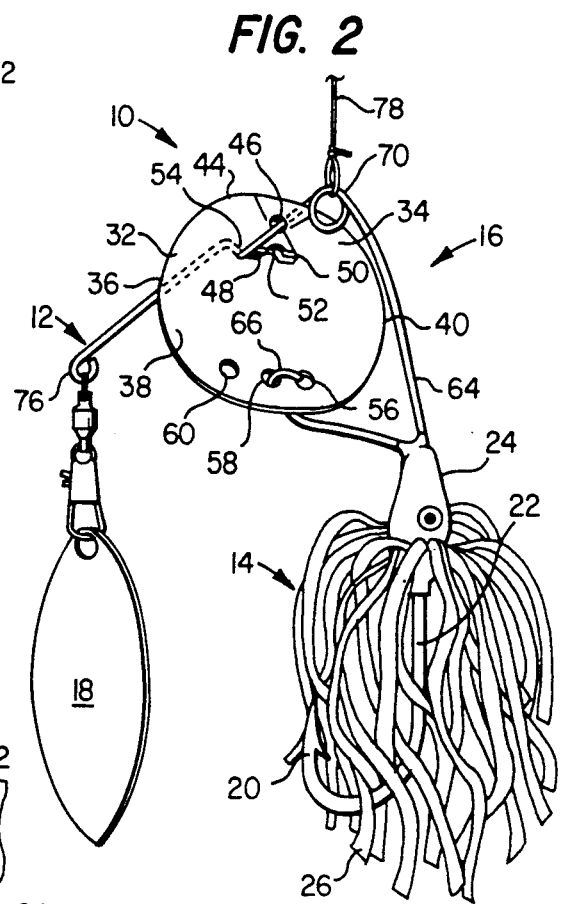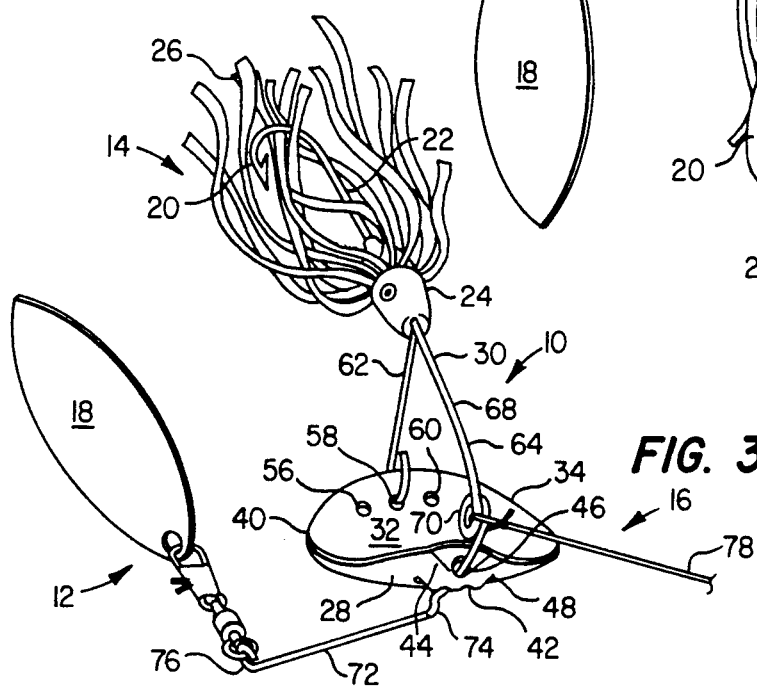

STEERABLE FISHING LURE

TECHNICAL FIELD OF THE INVENTION

This invention relates to the art of fishing, and in particular to a steerable fishing lure for attracting and catching fish.

BACKGROUND OF THE INVENTION

Fishing for commercial or sporting purposes is a world-wide industry in which millions of people find both employment and enjoyment. Throughout the world, fishers search for more effective ways to find and catch many kinds of fish. It is well known that certain types of fish like to hide in certain areas of lakes and streams, such as under low hanging branches or other structures that cover or shade the underlying water. Unfortunately, if a fishing lure is thrown directly into these areas, often the lure can tangle with the branches or structures. In such event, the fisher often loses the lure or at least is unable to reach the area. Thus, there is a need for a fishing lure that allows the fisher easily to reach covered or shaded areas of lakes and streams.

One way to solve the above problem may be to provide a fishing lure that the fisher can first cast to a point in the water close to, but sufficiently far away to avoid entanglement with, the above-water structure and then move the lure to the desired place in the water under the structure. A way to give the fisher the ability to move the fishing lure would be to provide a fishing lure that a fisher can steer to the shaded or covered water. To date, a steerable fishing lure of this type is not known to the fishing industry. If such a steerable fishing lure were to exist, a desireable characteristic would be the ability to adjust the degree of steering with each cast of the lure. There is, therefore, a need for a steerable fishing lure which a fisher can adjust to reach areas of lakes and streams covered or shaded by overhanging branches or other structures.

SUMMARY OF THE INVENTION

In accordance with the present invention, a steerable fishing lure is provided which permits the fisher to reach shaded or covered areas of lakes or streams without the risk of the lure entangling with overhanging branches or other structures.

According to one aspect of the present invention, a steerable fishing lure is provided which comprises a lure bait assembly, a hook assembly, and a rudder mechanism. The rudder mechanism includes a rudder dish and a harness. The rudder dish provides stable flow resistance for the rudder mechanism to produce a rudder effect on the lure. The harness firmly and adjustably attaches the rudder dish to the fishing lure. The combination of adjustable rudder dish and harness of the present invention permit the fisher to control the direction of fishing lure movement in the water.

In accordance with another aspect of the present invention, a steerable fishing lure is provided which comprises a lure bait assembly, a hook assembly, and a rudder mechanism. The rudder mechanism comprises a harness, and a rudder dish. The rudder dish has a broad and concave face and provides a flow resistance as the rudder mechanism moves in the water. The concave face directs water past the rudder dish. The flow resistance of the rudder dish face produces a rudder force for the rudder mechanism. Directing water from the concave face stabilizes the rudder as it moves in water. The harness attaches between the lure bait assembly and hook assembly and firmly holds the rudder dish to translate the rudder force of the rudder dish to the remainder of the fishing lure as it moves in the water. The harness further permits rudder dish adjustment to provide adjustable steering of the fishing lure.

In accordance with yet another aspect of the present invention, a steerable fishing lure is provided that includes a fishing lure, an adjustable rudder dish, and a harness. The adjustable rudder dish provides a rudder force and comprises a concave face that directs movement of water past the rudder dish. The rudder dish further includes a steering adjustment hinge and plurality of bias points. The harness permits adjustment of the rudder dish, and this adjustment, in turn, adjusts the direction of the rudder force. The harness firmly engages the rudder dish and comprises a tension wire and engagement shaft for engaging the steering adjustment hinge and a fastening wire for engaging the plurality of bias points. The harness rigidly mounts to the fishing lure to translate the rudder force from the rudder dish to the fishing lure and controls fishing lure movement through the water.

BRIEF DESCRIPTION OF THE DRAWINGS

A more complete understanding of the invention may be had by reference to the following Detailed Description when taken in conjunction with the accompanying Drawings, wherein:

FIG. 1 is a side view of the steerable fishing lure forming the present invention;

FIG. 2 is a front view of the steerable fishing lure forming the present invention;

FIG. 3 is a top view of the steerable fishing lure forming the present invention;

DETAILED DESCRIPTION OF THE INVENTION

Figure 4:
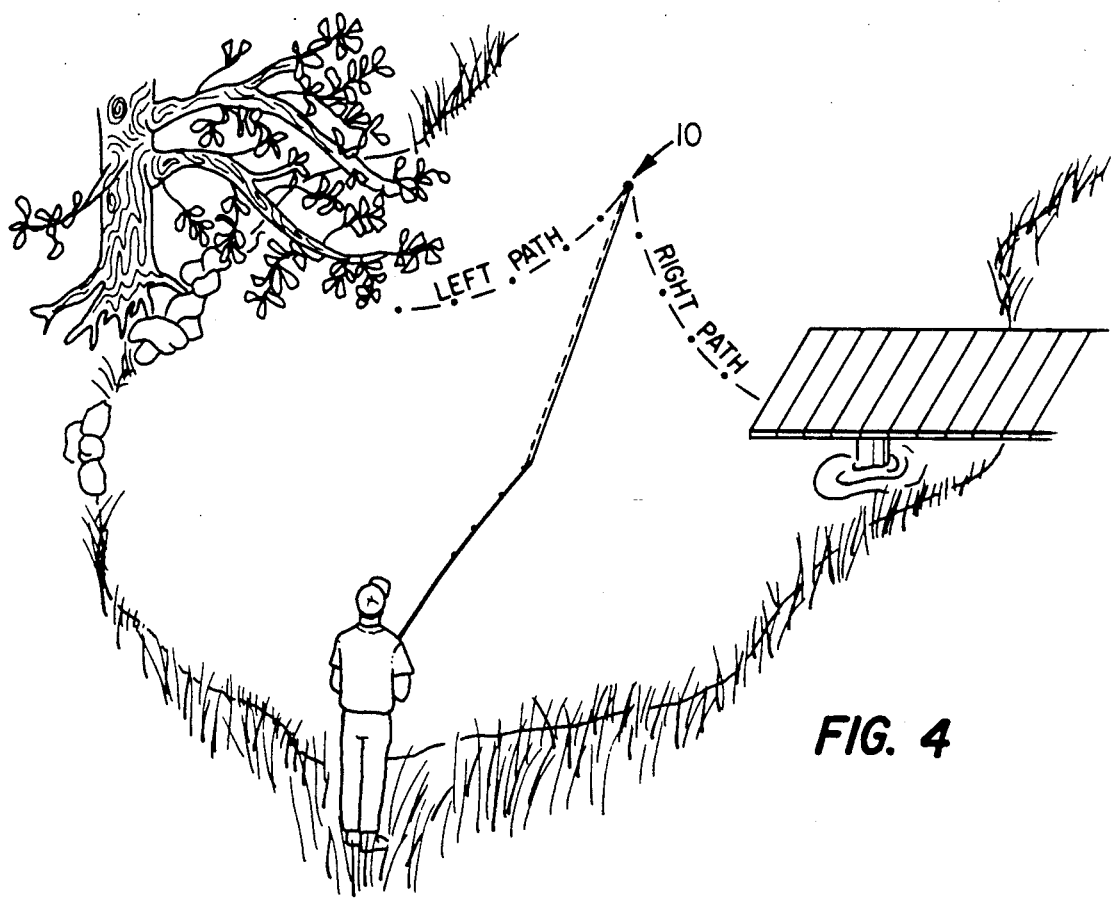
FIG. 4 is a view of the steering path that the steerable fishing lure of the present invention takes to reach shaded or covered areas of a lake or stream, according to a preferred embodiment of the present invention.

Referring now to the Drawings, wherein like reference characters designate like or corresponding parts throughout several views, FIGS. 1-3 illustrate one embodiment of steerable fishing lure 10 forming the present invention. Steerable fishing lure 10 includes three major assemblies: lure bait assembly 12, hook assembly 14, and rudder mechanism 16.

Lure bait assembly 12 is well known in the art and can use any known type of bait. The selection of lure bait assembly 12 depends on the particular feeding preferences of the fish species the fisher desires to catch. For example, in the preferred embodiment of FIGS. 1-3, lure bait assembly 12 comprises what is typically known as a spinner bait 18.

Hook assembly 14 comprises a barb or hook 20 formed at one end of shank 22. The opposite end of shank 22 is secured to weight member 24. A number of flexible filaments 26 may be secured to weight member 24. These filaments may form a weed deflector for deflecting objects that might otherwise entangle the hook as the fisher draws the lure through the water or may serve to attract fish along with spinner bait 18.

Rudder mechanism 16 is preferably of metal construction and mounts between lure bait assembly 12 and hook assembly 14. Rudder mechanism 16 comprises rudder dish 28 and harness 30. Rudder dish 28 includes concave face 32, top portion 34, left portion 36, bottom portion 38, and right portion 40. Top portion 34 extends slightly forward of the bottom portion 38 as lure 10 moves in the water and directs water flow into concave face 32. Steering adjustment hinge 42 appears at top portion 34 and includes recess 44, hinge pivot 46 and adjustment slot 48. In the preferred embodiment, adjustment slot 48 includes right notch 50, center notch 52, and left notch 54. Steering adjustment hinge 42 permits adjustment of rudder dish 28 position within harness 30 for steering control. In the preferred embodiment that FIGS. 1-3 illustrate, rudder dish 28 further includes bias points 56, 58, and 60.

Harness 30 of rudder mechanism 16 integrally attaches between lure bait assembly 12 and hook assembly 14 to firmly and adjustably hold rudder dish 28. Harness 30 comprises fastening wire 62 and tension wire 64, which both protrude from weight member 24, as FIGS. 1-3 show. Fastening wire 62 includes hook-end 66 that engages one of bias points 56, 58, or 60 of rudder dish 28. Tension wire 64 comprise one continuous piece of rust-proof spring wire metal and includes support shaft 68, tension coil 70, and engagement shaft 72. The length of support shaft 68 is sufficient to permit tension coil 70 to extend beyond top portion 34. Engagement shaft 72 extends from tension coil 70 and includes elbow 74 and eyelet 76. Tension coil 70 attaches to fishing line 78.

Engagement shaft 72 passes through hinge pivot 46 and the rudder dish 28 extending outwardly from concave face 32. Engagement shaft 72 extends from concave face 32 a distance approximately equal to the distance between hinge pivot 46 and adjustment slot 48. Elbow 74 is formed in engagement shaft 72 at a location to permit engagement shaft 72 to pass back through rudder dish 28 at adjustment slot 48. Upon passing through adjustment slot 48, engagement shaft 72 continues a distance sufficient for eyelet 76 to connect to the spinner bait 18 and to assure that it is well clear of rudder dish 28.

Rudder dish 28 is formed of a rust-proof sheet metal material. Rudder dish 28 in the preferred embodiment has an essentially circular design, but the design may be square, rectangular, or any other shape consistent with the objectives of the present invention. The size of rudder dish 28 may vary according to the relative sizes of lure bait assembly 12 and hook assembly 14. Principal constraints in sizing rudder dish 28 include having rudder dish 28 small enough to prevent excessive flow resistance that slows movement of lure 10 in the water, but large enough to produce a rudder effect to steer fishing lure 10 through the water.

Harness 30 comprises a rust-proof metal spring wire material. Harness 30 adjustably holds rudder dish 28 in position by spring tension engagement between shaft 72 and the dish 28. When fastening wire 62 engages one of bias points 56, 58, or 60, and engagement shaft 72 engages steering adjustment hinge 42, the tension coil 70 exerts a resilient force on the dish 28 through engagement shaft 72. Engagement shaft 72 translates this force to rudder dish 28, and tends to force rudder dish 28 away from fastening wire 62. The amount of spring force that tension coil 70 exerts on rudder dish 28 can vary, but the holding power of fastening wire 62 must exceed the spring force. Important limits on the spring force from tension coil 70 are that it be sufficient to firmly hold rudder dish 28 in place, but not so great that it makes steering adjustments difficult to perform.

Rudder dish 28 produces flow resistance as fishing lure 10 moves in the water. Concave face 32 smoothly directs water past rudder dish 28 as steerable lure 10 moves in the water. Smoothly directing water past rudder dish 28 yields a stabilizing effect that causes steerable lure 10 to maintain a steady course. The concavity of concave face 32 may vary so long as rudder dish 28 receives water and smoothly directs it past rudder dish 28.

The combination of rudder dish 28 and harness 30 provide the desired steering of lure 10. The position of engagement shaft 72 in adjustment slot 48 determines the position of the dish 28 and the rudder mechanism 16 steering direction. For example, if engagement shaft 72 is in center notch 52, top portion 34 leads rudder dish 28 as it moves through the water. This causes concave face 32 to direct water flow down rudder dish 28 and produces a force that has neither a right or left orientation, but that opposes the gravitational force on the lure in the water. If engagement shaft 72 occupies right notch 50, concave face 32 directs water flow into left portion 36 and out through right portion 40. This produces a force that causes rudder dish 28 to veer lure 10 in a rightward direction as shown in FIG. 4 in dash line. With engagement shaft 72 in left notch 54, a leftward steering direction occurs as shown in FIG. 4 in dot-dash line. The number of notches in adjustment slot 48 can vary depending on the desired gradation of steering orientations for the steerable fishing lure 10.

Spring tension of tension coil 70 must be overcome to change the steering direction of rudder dish 28. For example, to move engagement shaft 72 from right notch 50 to left notch 54 requires that engagement shaft 72 be pressed downwardly and clear of right notch 50. Once engagement shaft 72 clears right notch 50, the fisher can pivot engagement shaft 72 about hinge pivot 46 to left notch 54. Recess 44 and hinge pivot 46 permit engagement shaft 72 to pivot freely from right notch 50 to left notch 54. Once engagement shaft 72 reaches left notch 54, releasing the engagement shaft 72 allows spring tension from tension coil 70 to position engagement shaft 72 within left notch 54. Movement of engagement shaft 72 to other position notches within adjustment slot 48 proceeds in essentially the way the above discussion describes.

The position of hook-end 66 in bias points 56, 58, or 60 can bias the steering effect that engagement shaft 72 and adjustment slot 48 produce. For example, with hook-end 66 in right bias point 56 or left bias point 60, rudder dish 28 will have a right bias or left bias, respectively, as the user selects the steering direction of lure 10. With hook-end 66 engaging center bias point 58, however, no steering bias occurs.

Steering bias can be more easily understood by reference to the following example. Suppose that hook-end 66 engages right bias point 56. Then, with engagement shaft 72 in right notch 50, rudder dish 28 has a more definite right deflection than it would if hook-end 66 were to engage center bias point 58. With engagement shaft 72 in center notch 52, a right-biased center orientation occurs. Finally, with engagement shaft 72 in the left notch 54, a less left-oriented steering direction occurs in rudder dish 28. These biased configurations are useful if the fisher desires variations on the basic steering effects that adjustment slot 48 produces.

FIG. 4 illustrates the possible paths that the steerable fishing lure 10 of the present invention may take in the water. Thus, with steerable lure 10 in the water as the fisher pulls the steerable fishing lure 10 through the water, if engagement shaft 72 is in right notch 50 and hook-end 66 engages center bias point 58, the steerable fishing lure tends to move in a right direction. Similarly, in the same configuration, but with engagement shaft 72 in left notch 54, pulling steerable lure 10 through the water induces a left steering direction. Finally, placing engagement shaft 72 in center notch 52 eliminates a right or left steering orientation, causing lure 10 to travel in water as a conventional lure.

Figure 5:
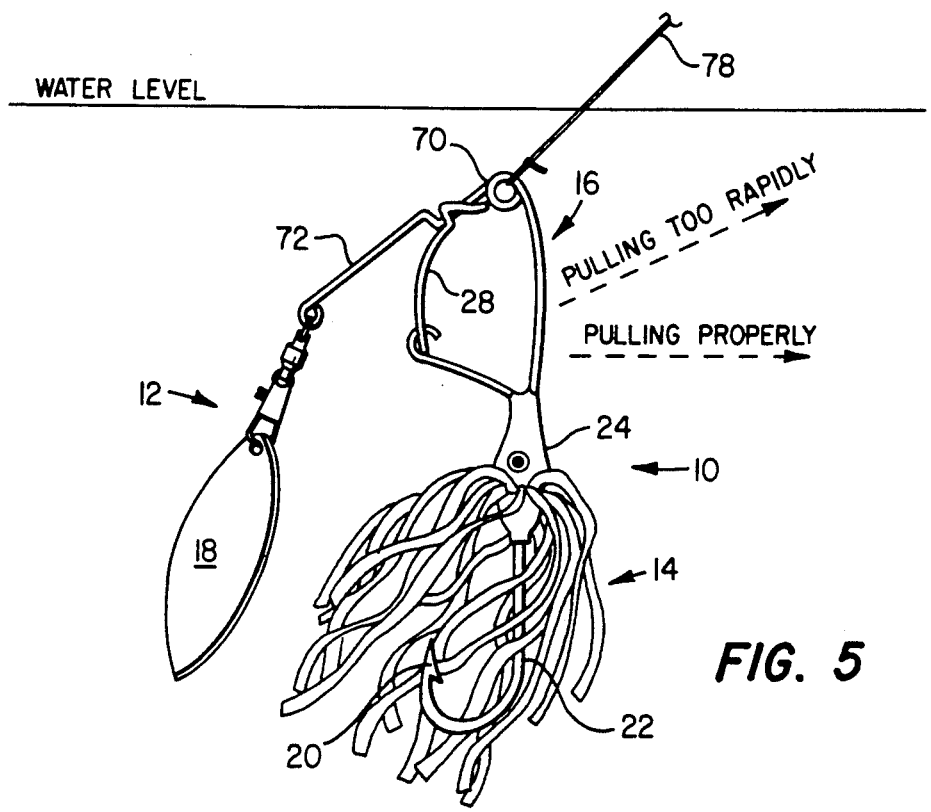
FIG. 5 demonstrates the way in which the preferred embodiment of the present invention regulates the speed with which a fisher pulls the steerable lure through the water.

In addition to the steering effects of steerable fishing lure 10, the fisher experiences a related benefit from the flow resistance the rudder dish 28 produces. FIG. 5 shows how the flow resistance further affects lure movement in the water. A common trait of inexperienced fishers is pulling a fishing lure too rapidly through the water. If the fisher pulls steerable fishing lure 10 through the water too rapidly, the flow resistance of rudder dish 28 causes steerable fishing lure 10 to rise in the water. When the fisher pulls the lure 10 of the present invention too rapidly and sees the lure rise to the top of the water, the fisher reduces the lure speed to cause it to reach a proper depth in the water. Pulling the lure more slowly causes the lure to pass through the water at a proper rate to attract fish. Thus, the steerable fishing lure of the present invention produces the added benefit of making the fisher generally more effective in operating a fishing lure.

Although only one embodiment of the invention has been illustrated in the accompanying Drawings and described in the foregoing Detailed Description, it will be understood that the invention is not limited to the embodiment disclosed, but is capable of numerous rearrangements, modifications and substitutions of parts and elements without departing from the spirit of the invention.

What is claimed is:

1. A steerable fishing lure, comprising:
   a bait assembly including a fish hook;
   an adjustable rudder dish for providing a rudder force, said rudder dish including a concave face for directing movement of water past said rudder dish, a steering adjustment hinge and a plurality of bias points;
   a harness connected to said bait assembly and rudder dish for permitting adjustment of said rudder dish to adjust the direction of said rudder force, said harness firmly engaging said rudder dish and comprising a tension wire for engaging said steering adjustment hinge and a fastening wire for engaging said bias points.

2. A steerable fishing lure, comprising:
   a lure bait assembly;
   a hook assembly; and
   a rudder mechanism for steering said lure located between said lure assembly and said hook assembly,
   said rudder mechanism including a rudder dish, a harness and a steering adjustment hinge,
   said rudder dish having a face,
   said face having a concave shape for receiving water and directing water from said face so as to stabilize said rudder mechanism as it moves in water,
   said harness connected to said lure bait assembly, said hook assembly, and said dish for firmly holding said rudder dish in a predetermined position,
   said rudder mechanism further including a steering adjustment hinge for rigidly and adjustably engaging said harness to adjustably position said rudder dish.

3. The fishing lure of claim 2 wherein said rudder includes a plurality of bottom bias points and said harness further includes a fastening wire projecting from said hook assembly for selectively engaging said bottom bias points for biasing the steering position of said rudder dish.

4. A steerable fishing lure, comprising:
   a lure bait assembly;
   a hook assembly; and
   a rudder mechanism for steering said lure located between said lure assembly and said hook assembly,
   said rudder mechanism including a rudder dish and a harness,
   said rudder dish having a face and a steering adjustment hinge,
   said face having a concave shape for receiving water and directing water from said face so as to stabilize said rudder mechanism as it moves in water,
   said hinge comprising a plurality of notches for engaging said harness, said harness connected to said lure bait assembly, said hook assembly, and said dish for firmly holding said rudder dish in a predetermined position.

5. The fishing lure of claim 4, wherein said plurality of notches further comprises a right notch, a center notch, and a left notch for adjustably directing said rudder mechanism to steer the lure in a right, center and left direction.

6. The steerable fishing lure of claim 4, wherein said bait assembly comprises a spinner bait lure.

* * * * *